(12) United States Patent
Lathrop et al.

(10) Patent No.: US 9,238,409 B2
(45) Date of Patent: Jan. 19, 2016

(54) STEERING WHEEL AND INTEGRATED TOUCHPADS FOR INPUTTING COMMANDS

(75) Inventors: William Brian Lathrop, San Jose, CA (US); Evan Small, Palo Alto, CA (US); Enrique Rodriguez, Mountain View, CA (US)

(73) Assignee: VOLKSWAGEN AG, Wolfsburg (DE)

( * ) Notice: Subject to any disclaimer, the term of this patent is extended or adjusted under 35 U.S.C. 154(b) by 1027 days.

(21) Appl. No.: 12/848,657

(22) Filed: Aug. 2, 2010

(65) Prior Publication Data

US 2011/0043468 A1 Feb. 24, 2011

Related U.S. Application Data

(60) Provisional application No. 61/231,880, filed on Aug. 6, 2009.

(51) Int. Cl.
*G06F 3/041* (2006.01)
*B60K 37/06* (2006.01)

(52) U.S. Cl.
CPC .......... *B60K 37/06* (2013.01); *B60K 2350/928* (2013.01); *Y10T 74/20834* (2015.01)

(58) Field of Classification Search
USPC ............... 345/173; 340/407.1, 407.2; 701/36
See application file for complete search history.

(56) References Cited

U.S. PATENT DOCUMENTS

| | | | |
|---|---|---|---|
| 5,270,689 A | 12/1993 | Hermann | |
| 5,844,547 A * | 12/1998 | Minakuchi | G06F 3/0481 345/156 |
| 6,819,990 B2 | 11/2004 | Ichinose | |
| 7,126,583 B1 | 10/2006 | Breed | |
| 7,295,904 B2 | 11/2007 | Kanevsky et al. | |
| 7,441,800 B2 | 10/2008 | Weber et al. | |
| 7,489,303 B1 * | 2/2009 | Pryor | 345/173 |
| 8,307,302 B2 * | 11/2012 | Takaki | G06F 3/0482 715/810 |
| 2002/0158838 A1 * | 10/2002 | Smith et al. | 345/156 |
| 2003/0043114 A1 * | 3/2003 | Silfverberg et al. | 345/157 |
| 2003/0043174 A1 * | 3/2003 | Hinckley | G06F 3/03547 345/684 |
| 2005/0024344 A1 * | 2/2005 | Trachte | 345/173 |
| 2005/0273218 A1 * | 12/2005 | Breed et al. | 701/2 |
| 2006/0047386 A1 * | 3/2006 | Kanevsky et al. | 701/36 |

(Continued)

FOREIGN PATENT DOCUMENTS

| | | |
|---|---|---|
| DE | 200 20 227 | 4/2001 |
| DE | 101 39 693 | 5/2002 |

(Continued)

OTHER PUBLICATIONS

U.S. Appl. No. 61/149,523, filed Feb. 3, 2009, (certified English-language translation provided).

(Continued)

*Primary Examiner* — Abbas Abdulselam
*Assistant Examiner* — Gerald Oliver
(74) *Attorney, Agent, or Firm* — Kenyon & Kenyon LLP

(57) ABSTRACT

A motor vehicle includes a steering wheel, a first touchpad integrated into the steering wheel adapted to input commands, a second touchpad integrated into the steering wheel and spatially separated from the first touchpad adapted to input commands, and a coordination module adapted to generate a command to operate a function of the motor vehicle as a function of a touch motion over the first touchpad and a simultaneously-occurring touch motion over the second touchpad.

21 Claims, 7 Drawing Sheets

(56) References Cited

U.S. PATENT DOCUMENTS

| | | |
|---|---|---|
| 2008/0174570 A1 | 7/2008 | Jobs et al. |
| 2010/0188343 A1* | 7/2010 | Bach .............................. 345/173 |
| 2010/0269038 A1* | 10/2010 | Tsuda ............................ 715/702 |

FOREIGN PATENT DOCUMENTS

| | | |
|---|---|---|
| DE | 103 18 713 | 12/2003 |
| DE | 10 2004 007 253 | 6/2005 |
| DE | 10 2006 019 065 | 10/2007 |
| DE | 10 2006 024 252 | 1/2008 |
| EP | 0 366 132 | 5/1990 |
| EP | 0 612 292 | 8/1994 |
| EP | 1 286 861 | 3/2003 |
| EP | 1 679 221 | 7/2006 |
| WO | WO 2005/025942 | 3/2005 |

OTHER PUBLICATIONS

U.S. Appl. No. 12/699,689, filed Feb. 3, 2010.

* cited by examiner

STEERING WHEEL AND INTEGRATED TOUCHPADS FOR INPUTTING COMMANDS

CROSS-REFERENCE TO RELATED APPLICATIONS

The present application claims the benefit of U.S. Provisional Patent Application No. 61/231,880, filed on Aug. 6, 2009, which is expressly incorporated herein in its entirety by reference thereto.

The present application is related to U.S. patent application Ser. No. 12/848,695, filed on the even date herewith, entitled "Motor Vehicle," which is expressly incorporated herein in its entirely by reference thereto.

FIELD OF THE INVENTION

The present invention relates to a motor vehicle, e.g., having a steering wheel and a touchpad integrated into the steering wheel for inputting commands.

BACKGROUND INFORMATION

According to German Published Patent Application No. 101 39 693, in modern electronic devices in a vehicle that constantly offer additional functions with more and more options, multi-function operating elements, by which various functions of the connected devices can be controlled, have been created because of the limited installation space for the associated operating elements. Thus European Patent No. 0 366 132 describes, for example, a multifunction operating device for motor vehicles, in which function groups and individual functions are selected with the aid of a rotary switch, and in which an ENTER function can be triggered. One and the same bidirectional rotary switch is used for selecting menus and individual functions. This rotary switch has click-stop positions, to which menus or individual functions are assigned, the ENTER function being able to be triggered by an axial motion of the rotary switch. Such a multifunction operating device is used, for example, to enter the destination of a navigation system. To this end, an alphanumeric keyboard is illustrated on a display unit, the user being able to move forwards and backwards in the alphanumeric keyboard with the aid of the bidirectional motion of the rotary switch. When the cursor is then situated on the desired alphanumeric character, the latter can be selected by an axial motion of the rotary switch and transferred into the navigation system.

German Published Utility Model No. 200 20 227 discloses a motor vehicle steering wheel having two operating elements fixed on the steering wheel for controlling vehicle functions in a vehicle, the operating elements including respectively a touch-sensitive sensor surface, which produces an electronic signal when touched.

U.S. Provisional Patent Application No. 61/149,523 and U.S. patent application Ser. No. 12/699,689 describe a motor vehicle having a steering wheel, the motor vehicle including a first display integrated into the steering wheel for variably displaying information, a first touch screen situated above the first display for inputting commands, a second display integrated into the steering wheel so as to be spatially separated from the first display for variably displaying information, and a second touch screen situated above the second display for inputting commands.

U.S. Published Patent Application No. 2008/0174570 describes a method for gesture recognition.

Two steering wheel rockers are provided for a steering wheel of a VW Golf, by which a map detail may be zoomed.

German Published Patent Application No. 10 2006 024 252 discloses a vehicle cockpit having a vehicle steering wheel that has an outer surface that is accessible to a user, the steering wheel being developed in such a way that via the steering wheel it is possible to detect finger movements on the outer surface of the steering wheel, an evaluation circuit for generating evaluation signals being provided, which are correlated with the finger movement and the position of the finger on the steering wheel.

German Published Patent Application No. 10 2004 007 253 discloses a steering wheel for a motor vehicle having a hub body, a steering wheel rim, at least one steering wheel spoke for fastening the steering wheel rim on the hub body, and at least one reflection-optical sensor device situated on the hub body, on the steering wheel rim or on the steering wheel spoke for controlling and/or regulating a module of a motor vehicle.

German Published Patent Application No. 10 2006 019 065 discloses an input interface for a vehicle cockpit, which includes a switch lever, the switch lever having a knob end that forms a finger support surface, a detection device being provided for generating an output signal in accordance with the position of a finger on the finger support surface.

European Patent No. 1 286 861 discloses a safety device and at least one driver-operable device, which may be used in a motor vehicle, each driver-operable device including a manually operable operating element and a display window, the safety device including a memory for storing a graphically almost exact copy image of an operating element of a driver-operable device and a head-up display for projecting a head-up display image of the mentioned graphically almost exact copy image, a plurality of finger position detection sensors being provided for continuously tracking the current position of a finger tip of the driver.

PCT Published Patent Application No. WO 2005/025942 discloses a capacitive touch sensor in a motor vehicle.

SUMMARY

Example embodiments of the present invention improve and/or simplify the operator control of a motor vehicle. For this purpose, it is particularly desirable that the driver is not distracted from traffic events even when operating complex devices. In particular, the control operation of a motor vehicle should be able to be performed very quickly.

According to example embodiments of the present invention, a motor vehicle includes a steering wheel, a first touchpad integrated into the steering wheel for inputting commands, a second touchpad integrated into the steering wheel and spatially separated from the first touchpad for inputting commands, and an evaluation module for generating a command (distinct from a command generated by touching or by a touching motion of only one touchpad) for operating a function of the motor vehicle as a function of a touching motion (or a direction of the touching motion) over the first touchpad and a simultaneous touching motion (or a direction of the touching motion) over the second touchpad. Example embodiments of the present invention may be used e.g. in combination with infotainment applications, navigation applications, vehicle settings, driver assistance applications, communications applications (telephone, e-mail, instant messages, blogging, etc.), digital photography, digital video recording, web browsing, etc.

A touchpad may include, a (e.g. resistively or capacitively) touch-sensitive surface. A touchpad may include a touch screen. A display may possibly be situated underneath a touchpad. In particular, there is a provision, however, that no display is provided underneath the touchpad. A touchpad may be non-transparent and may be opaque. A touchpad may be arranged as an optical joystick. The mobile telephone Sony Ericsson XPERIA X1 has an optical joystick for example. A touching motion may be a motion over an optical joystick for input as well as a touching motion over a touchpad.

A function of a motor vehicle may include the receiving frequency of a radio, the volume of an acoustic output in the motor vehicle, a sound adjustment (type and balance), a selection of a map detail, a title selection, a selection of a destination and/or a temperature adjustment, etc. A function of a motor vehicle may be a function for which a setpoint value is to be met from a selection of, in particular continuous, values. A function of a motor vehicle may be a function that is adjustable in analog fashion, in particular following a scale. The function of the motor vehicle may include scrolling through a list. The function of the motor vehicle may include shifting a map detail. The function of the motor vehicle may include scaling a map detail. The function of the motor vehicle may include moving an element represented on the display.

The first touchpad may be situated in the left lateral region of the steering wheel. In this instance, there is in particular a provision that no part of the first touchpad is situated more than 15 cm from the edge of the steering wheel. In particular, there is a provision that the center of the first touchpad is situated no more than 10 cm from the edge of the steering wheel. The second touchpad may be situated in the right lateral region of the steering wheel. In this instance, there is in particular a provision that no part of the second touchpad is situated more than 15 cm from the edge of the steering wheel. In particular, there is a provision that the center of the second touchpad is situated no more than 10 cm from the edge of the steering wheel.

The motor vehicle may include a first actuator for producing a haptic feedback when touching the first touchpad. The motor vehicle may include a second actuator for producing a haptic feedback when touching the second touchpad.

The motor vehicle may include a display for representing a map detail, the map detail being scalable and/or shiftable as a function of a touching motion over the first touchpad and a simultaneously occurring touching motion over the second touchpad. The map detail may be enlarged as a function of a touching motion over the first touchpad directed toward the edge of the steering wheel and a simultaneously occurring touching motion over the second touchpad directed toward the edge of the steering wheel. The map detail may be reduced as a function of a touching motion over the first touchpad directed toward the center of the steering wheel and a simultaneously occurring touching motion over the second touchpad directed toward the center of the steering wheel. The map detail may be enlarged as a function of a touching motion over the first touchpad directed toward the left and a simultaneously occurring touching motion over the second touchpad directed toward the right. The map detail may be reduced as a function of a touching motion over the first touchpad directed toward the right and a simultaneously occurring touching motion over the second touchpad directed toward the left.

A display may include a head-up display for example. A display may be situated in an instrument cluster for the variable representation of information. Such a display may be situated for example between two analog instruments in the instrument cluster. A display may include a TFT or a TFT-like display.

The map detail may be shifted in the direction of the touching motion over the first touchpad directed toward the edge of the steering wheel as a function of a touching motion over the first touchpad directed toward the edge of the steering wheel and a simultaneously occurring touching motion over the second touchpad directed toward the center of the steering wheel. The map detail may be shifted in the direction of the touching motion over the first touchpad directed toward the center of the steering wheel as a function of a touching motion over the first touchpad directed toward the center of the steering wheel and a simultaneously occurring touching motion over the second touchpad directed toward the edge of the steering wheel. The map detail may be shifted to the left as a function of a touching motion over the first touchpad directed toward the left and a simultaneously occurring touching motion over the second touchpad directed toward the left. The map detail may be shifted to the right as a function of a touching motion over the first touchpad directed toward the right and a simultaneously occurring touching motion over the second touchpad directed toward the right.

The map detail may be shifted downward as a function of a downwardly directed touching motion over the first touchpad and a simultaneously occurring downwardly directed touching motion over the second touchpad. The map detail may be shifted upward as a function of an upwardly directed touching motion over the first touchpad and a simultaneously occurring upwardly directed touching motion over the second touchpad.

The motor vehicle may include a display for representing a list of selectable list entries, it being possible to scroll through the list at a first scrolling speed as a function of a touching motion over the first touchpad through the list, it being possible to scroll through the list at a second scrolling speed as a function of a touching motion over the first touchpad and a simultaneously occurring touching motion over the second touchpad, the second scrolling speed being greater than the first scrolling speed.

A list entry may be a telephone number or a telephone book entry for example. A list entry may be an icon or symbol and/or an entry for calling up a submenu. A list entry may also be a click-stop position of a scale. Thus a list entry may be, for example, a click-stop position for setting a volume or a station. A list entry may be a digital incremental step. Thus a list entry may be, for example, a natural number, e.g., for indicating a temperature if a temperature selection is made in whole numbers. Thus a list entry may be the setpoint temperature of 21° C. for example. Examples of list entries are shown, for example, in FIGS. 6 to 8 of German Published Patent Application No. 101 39 693; German Published Patent Application No. 101 39 693 is expressly incorporated herein in its entirety by reference thereto.

A list may also be an arrangement of operating elements. By the aforementioned scrolling it is possible to change the displayed range of a list and/or to select or mark a list entry. By scrolling it is possible, for example, to shift the marking (for the activation or selection) of the word telephone number shown in FIG. 6 of German Published Patent Application No. 101 39 693 downward or upward. By scrolling it is possible in particular to shift a marking, an activation or a selection for list entries. Furthermore, additional list entries may be displayed by scrolling. There may be a provision for a list entry to be selected by pressing onto one of the touchpads. The lists represented in FIGS. 6 to 8 of German Published Patent Application No. 101 39 693 are examples.

A method is for operating a motor vehicle—in particular a motor vehicle including one or more of the aforementioned features—having a steering wheel, the motor vehicle including a first touchpad integrated into the steering wheel for inputting commands and a second touchpad integrated into the steering wheel and spatially separated from the first touchpad for inputting commands, and a command (distinct from a command generated by touching or by a touching motion of only one touchpad) for operating a function of the motor vehicle being generated or produced as a function of the touching motion (or a direction of the touching motion) over the first touchpad and the simultaneously occurring touching motion (or a direction of the touching motion) over the second touchpad.

A method is for operating a motor vehicle—in particular a motor vehicle including one or more of the aforementioned features—having a display and having a steering wheel, the motor vehicle including a first touchpad, integrated into the steering wheel, for inputting commands and a second touchpad integrated into the steering wheel and spatially separated from the first touchpad for inputting commands, and a map detail represented by the display being scaled and/or shifted as a function of a touching motion (or a direction of the touching motion) over the first touchpad and a simultaneously occurring touching motion (or a direction of the touching motion) over the second touchpad.

The map detail may be enlarged as a function of a touching motion over the first touchpad directed toward the edge of the steering wheel and a simultaneously occurring touching motion over the second touchpad directed toward the edge of the steering wheel. The map detail may be reduced as a function of a touching motion over the first touchpad directed toward the center of the steering wheel and a simultaneously occurring touching motion over the second touchpad directed toward the center of the steering wheel. The map detail may be enlarged as a function of a touching motion over the first touchpad directed toward the left and a simultaneously occurring touching motion over the second touchpad directed toward the right. The map detail may be reduced as a function of a touching motion over the first touchpad directed toward the right and a simultaneously occurring touching motion over the second touchpad directed toward the left.

The map detail may be shifted to the left as a function of a touching motion over the first touchpad directed toward the left and a simultaneously occurring touching motion over the second touchpad directed toward the left. The map detail may be shifted to the right as a function of a touching motion over the first touchpad directed toward the right and a simultaneously occurring touching motion over the second touchpad directed toward the right. The map detail may be shifted downward as a function of a downwardly directed touching motion over the first touchpad and a simultaneously occurring downwardly directed touching motion over the second touchpad. The map detail may be shifted upward as a function of an upwardly directed touching motion over the first touchpad and a simultaneously occurring upwardly directed touching motion over the second touchpad.

A method is for operating a motor vehicle—particularly a motor vehicle including one or more of the aforementioned features—having a display for representing a list of selectable list entries and having a steering wheel, the motor vehicle including a first touchpad integrated into the steering wheel for inputting commands and a second touchpad integrated into the steering wheel and spatially separated from the first touchpad for inputting commands, it being possible to scroll through the list at a first scrolling speed as a function of a touching motion over the first touchpad through the list, scrolling through the list taking place at a second scrolling speed as a function of a touching motion (or a direction of the touching motion) over the first touchpad and a simultaneously occurring touching motion (or a direction of the touching motion) over the second touchpad, the second scrolling speed being greater than the first scrolling speed.

A motor vehicle may be, for example, a land vehicle that may be used individually in road traffic. However, motor vehicles are not restricted to land vehicles having an internal combustion engine.

Further features and aspects of example embodiments of the present invention are described in more detail below with reference to the appended Figures.

DETAILED DESCRIPTION

Figure 1:
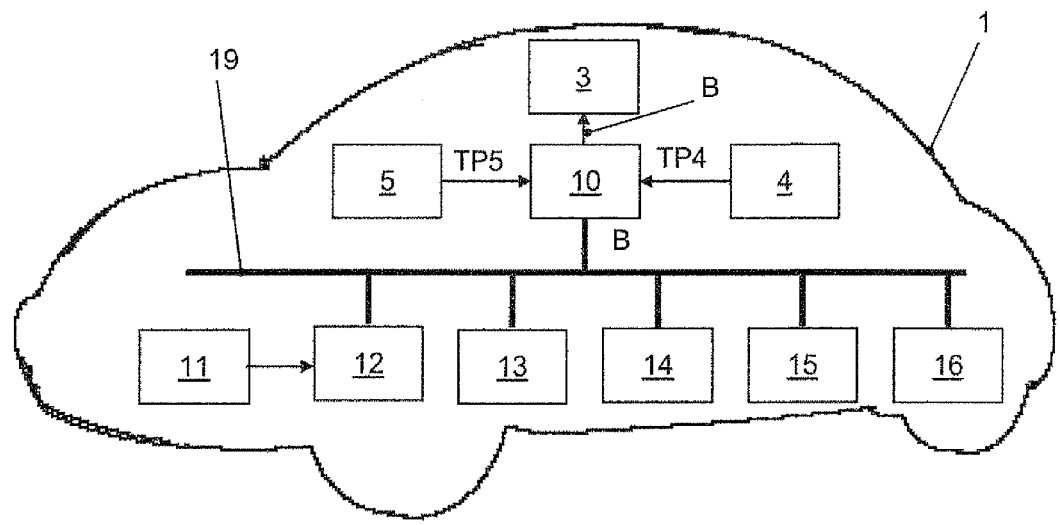
FIG. 1 schematically illustrates an exemplary embodiment of a motor vehicle.
Figure 2:
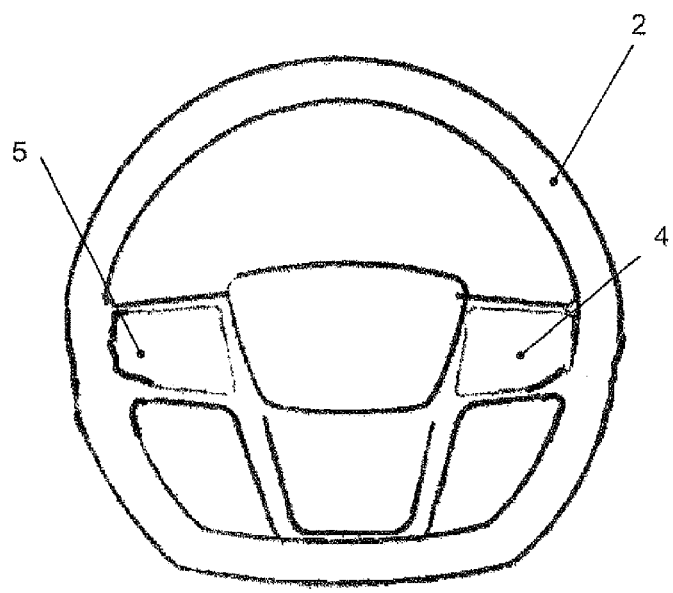
FIG. 2 illustrates an exemplary embodiment of a steering wheel of the motor vehicle shown in FIG. 1.

FIG. 1 schematically illustrates a motor vehicle 1. Motor vehicle 1 has a steering wheel 2 represented in FIG. 2, which includes on its left and right edge respectively a touchpad 5 for inputting commands and a touchpad 4 for inputting commands.

Figure 4:
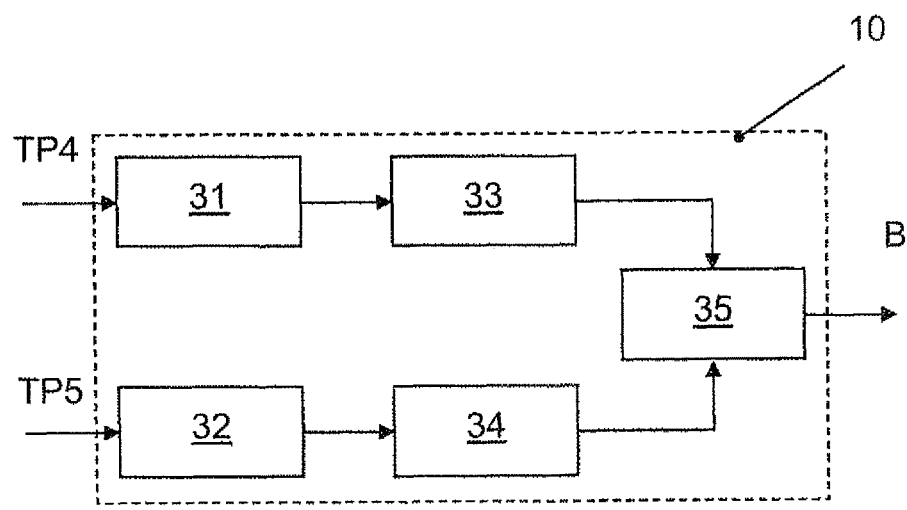
FIG. 4 shows an exemplary embodiment of a control system.

In addition, motor vehicle 1 includes a control system 10 for controlling a display and for evaluating the output signals TP4 and TP5 of touchpads 4 and 5. FIG. 4 shows a detailed representation of control system 10. Control system 10 includes an interface 31 for reading in an output signal TP4 of touchpad 4 and an interface 32 for reading in output signal TP5 of touchpad 5. Evaluation modules 33 and 34 for evaluating output signals TP4 and TP5 of touchpads 4 and 5 are connected to interfaces 31 and 32. The output signals of these evaluation modules 33 and 34 are input signals into a coordination module 35 for generating a command B for operating a function of motor vehicle 1 as a function of the output signals of evaluation modules 33 and 34.

Via a bus system 19, control system 10 is connected to a Bluetooth interface 12, a navigation system 13, an automatic climate control 14, an infotainment system 15, and a vehicle control unit 16. Using touchpads 4 and 5, it is possible to operate—by appropriate commands B—for example navigation system 13, automatic climate control 14, infotainment system 15, vehicle control unit 16 and—via Bluetooth interface 12—a mobile telephone 11. For operating motor vehicle 1 or functions of motor vehicle 1 such as navigation system 13, automatic climate control 14, infotainment system 15, or a distance control system, which may be implemented in vehicle control unit 16 for example, a higher-order menu is represented by a display 3, which is operable using touchpads 4 and 5.

Figure 3:
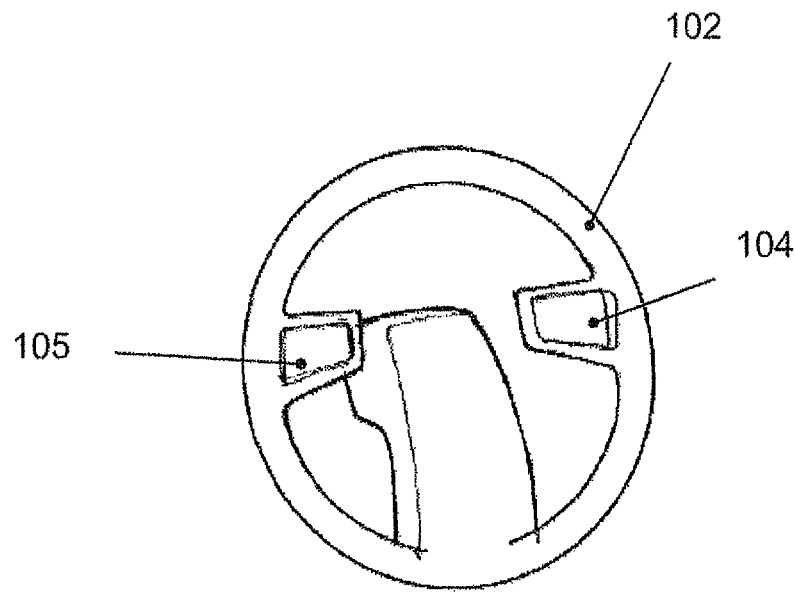
FIG. 3 shows an exemplary embodiment of a steering wheel.

FIG. 3 shows an alternative arrangement of a steering wheel 102. There may be a provision to use steering wheel 102 instead of steering wheel 2. Steering wheel 102 includes a touchpad 104 corresponding to touchpad 4 and a touchpad 105 corresponding to touchpad 5.

Figure 5:
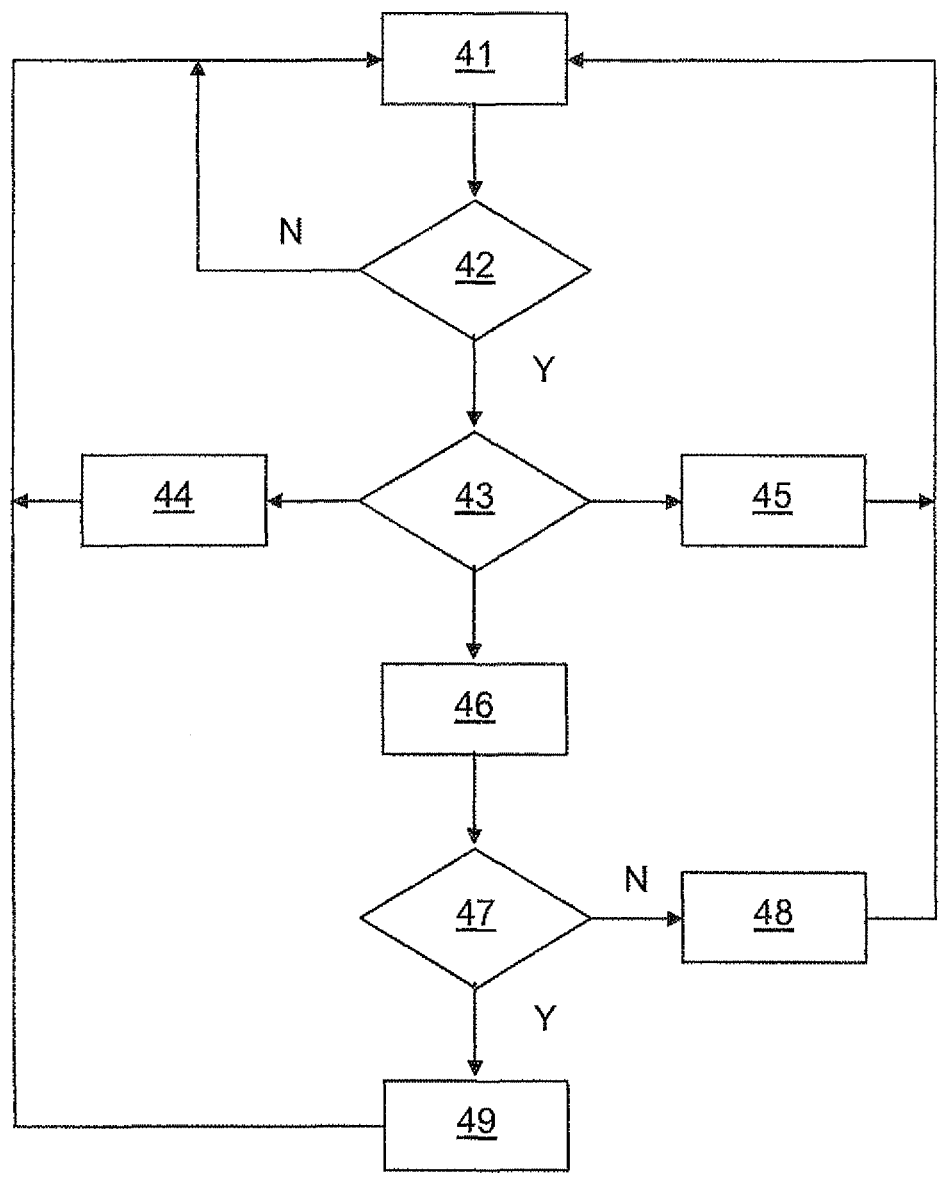
FIG. 5 shows a method implementable in an evaluation module.

FIG. 5 shows an exemplary embodiment of a method implemented in evaluation modules 33 and 34, which is described in the following with reference to evaluation module 33. The method starts with a step 41, in which the output signal of interface 31 is read in. Step 41 is followed by a query 42 to determine whether a touch of touchpad 4 has been detected. If no touch of touchpad 4 has been detected, then query 42 is again followed by step 41. Otherwise, query 42 is followed by a query 43 for ascertaining the type of touch.

If query 43 detects a withdrawal from touchpad 4, then query 43 is followed by a step 44, in which a command associated with this withdrawal is generated. Furthermore, a memory, in which coordinates of a previously performed touch are stored, is deleted in step 44. Step 44 in turn is followed by step 41. If query 43 detects a pressing action on touchpad 4, then a command associated with the pressing action on touchpad 4 is generated. Step 45 in turn is followed by step 41. If query 43 detects a touching motion over touchpad 4, then query 43 is followed by a step 46, in which the distance from a previously detected touch point is detected.

Step 46 is followed by a query 47 as to whether the distance exceeds a specific threshold value. If the distance does not exceed this specific threshold value, then query 47 is followed by a step 48, in which the coordinates of the touch are stored. Otherwise, query 47 is followed by a step 49, in which a trajectory of the touching motion is output. Steps 48 and 49 are again followed by step 41.

Figure 6:
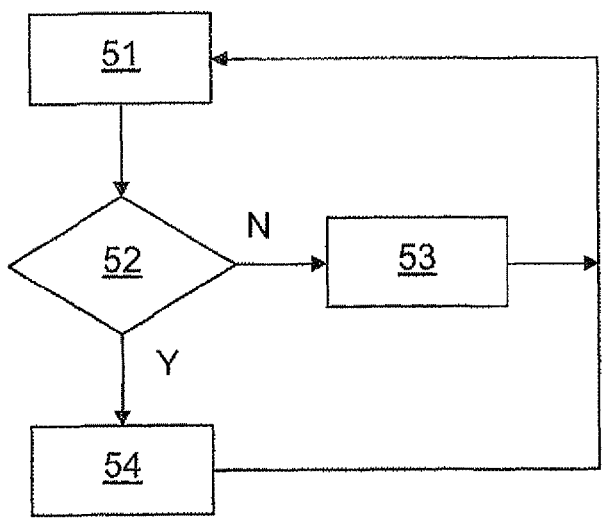
FIG. 6 shows a method implementable in a coordination module.

FIG. 6 shows a method implemented in coordination module 35. For this purpose, in a step 51, the output signals of evaluation modules 33 and 34 are first read in. Step 51 is followed by a query 52 as to whether a simultaneous touching motion over touchpads 4 and 5 occurs. If a touching motion over touchpad 4 occurs simultaneously with a touching motion over touchpad 5, then query 52 is followed by a step 54, in which a command is generated for operating a function of motor vehicle 1 as a function of the direction of the touching motion over touchpad 4 and the direction of the touching motion over touchpad 5. If there is no simultaneous touching motion over touchpads 4 and 5, then query 52 is followed by a step 53, in which a command possibly generated in accordance with the method described in FIG. 5 is output. Steps 53 and 54 are again followed by step 51.

The following table shows the commands generated by steps 53 and 54 when a touching motion over touchpads 4 and/or 5 is detected:

| context | input type | touching motion touchpad 5 | touching motion touchpad 4 | command |
|---|---|---|---|---|
| map | simultaneous | outward/ to the left | outward/ to the right | enlarge map (reduce scale) |
| map | simultaneous | inward/ to the right | inward/ to the left | reduce map (increase scale) |
| map | not simultaneous | outward/ to the left | — | rotate map counter-clockwise |
| map | not simultaneous | — | outward/ to the right | rotate map clockwise |
| map | not simultaneous | inward/ to the right | — | rotate map clockwise |
| map | not simultaneous | — | inward/ to the left | rotate map counter-clockwise |
| map | simultaneous | inward/ to the right | outward/ to the right | move map to the right |
| map | simultaneous | outward/ to the left | inward/ to the left | move map to the left |
| map | simultaneous | downward | downward | move map downward or tilt map forward |
| map | simultaneous | upward | upward | move map upward or tilt map backward |
| list | not simultaneous | outward/ to the left | — | scroll to the left or upward |
| list | not simultaneous | — | outward/ to the right | scroll to the right or downward |
| list | not simultaneous | inward/ to the right | — | scroll to the right or downward |
| list | not simultaneous | — | inward/ to the left | scroll to the left or upward |
| list | not simultaneous | downward | — | scroll downward |
| list | not simultaneous | — | downward | scroll downward |
| list | not simultaneous | upward | — | scroll upward |
| list | not simultaneous | — | upward | scroll upward |
| list | simultaneous | inward/ to the right | outward/ to the right | scroll at increased scrolling speed to the right or downward |
| list | simultaneous | outward/ to the left | inward/ to the left | scroll at increased scrolling speed to the left or upward |
| list | simultaneous | downward | downward | scroll at increased scrolling speed downward |
| list | simultaneous | upward | upward | scroll at increased scrolling speed upward |

Figure 8:
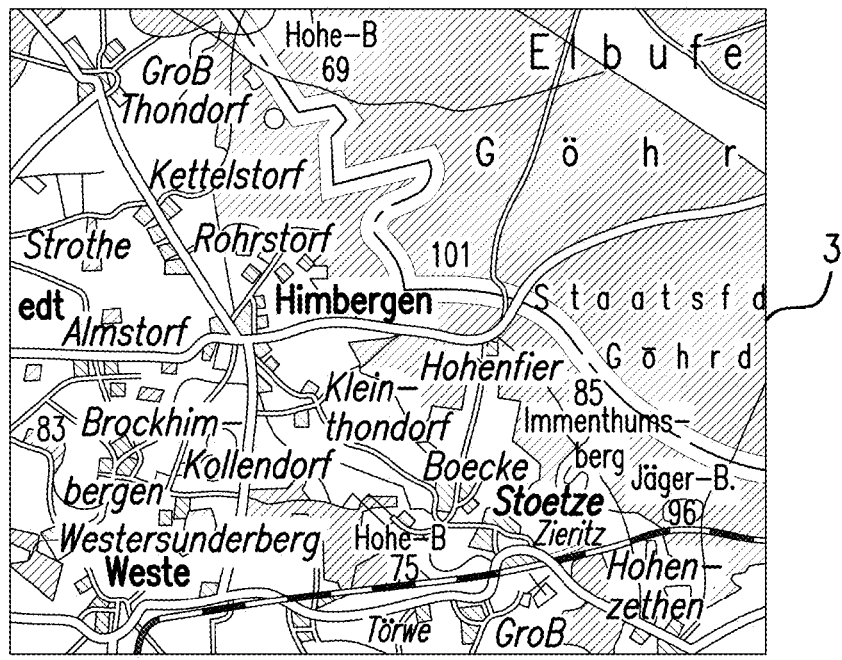
FIG. 8 shows a map detail represented by a display.
Figure 9:
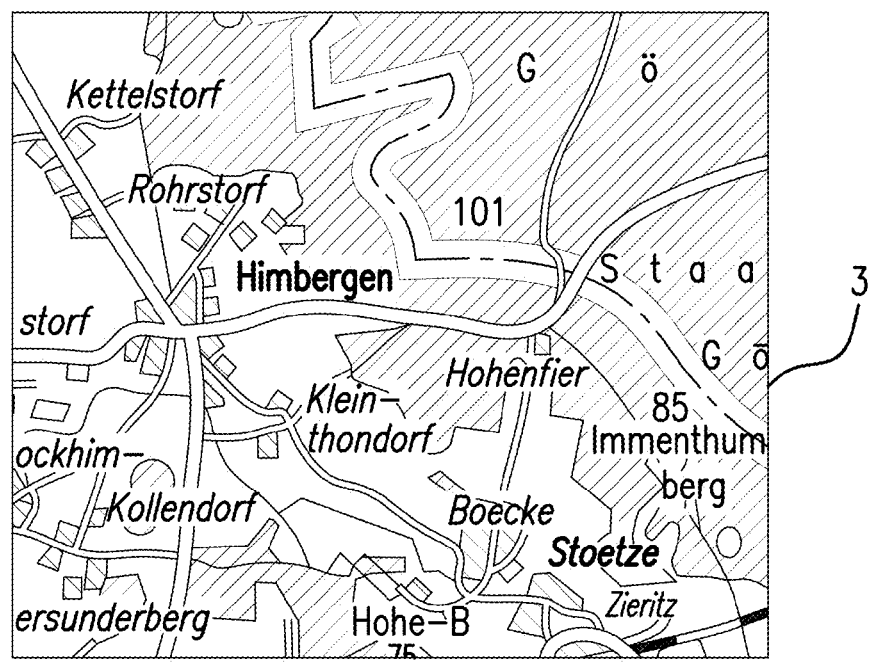
FIG. 9 shows a map detail represented by a display in enlarged fashion.
Figure 10:
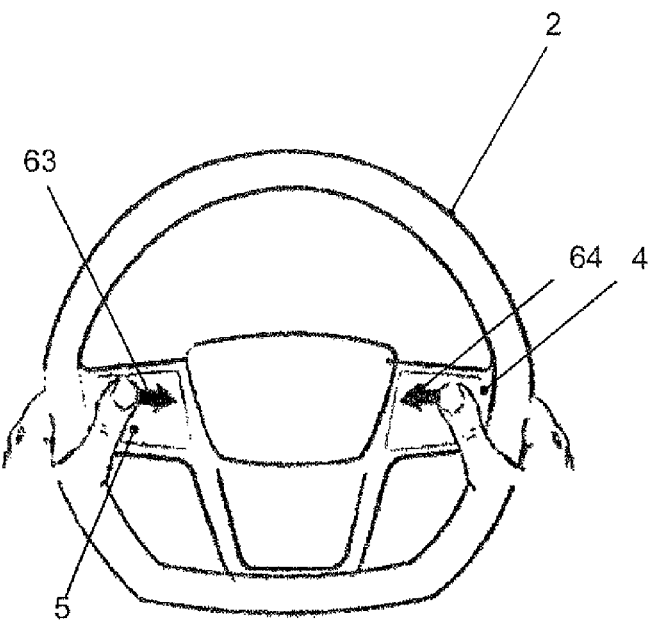
FIG. 10 shows the steering wheel represented in FIG. 2.

If a map detail is represented by display 3 for example, and there is a touching motion over touchpad 5 in the direction of the arrow indicated by reference numeral 61 and there is simultaneously a touching motion over touchpad 4 in the direction of the arrow indicated by reference numeral 62, then the map detail represented by display 3 is enlarged as represented in exemplary fashion in FIGS. 8 and 9. In this instance, FIG. 8 shows the map detail prior to the touching motion over touchpads 4 and 5 corresponding to arrows 61 and 62, and FIG. 9 shows the map detail after this touching motion over touchpads 4 and 5.

If there is a touching motion over touchpad 5 in the direction of the arrow indicated by reference numeral 63 and simultaneously a touching motion over touchpad 4 in the direction of the arrow indicated by reference numeral 64, then the map detail is reduced. In this instance, FIG. 9 shows the map detail prior to the touching motion over touchpads 4 and 5 corresponding to arrows 63 and 64, and FIG. 8 shows the map detail after this touching motion over touchpads 4 and 5.

If there is a touching motion over touchpad 5 toward the left (that is, in the direction of arrow 61) and at the same time a touching motion over touchpad 4 toward the left (that is, in the direction of arrow 64), then the map detail is shifted to the left. If there is a touching motion over touchpad 5 toward the right (that is, in the direction of arrow 63) and at the same time a touching motion over touchpad 4 toward the right (that is, in the direction of arrow 62), then the map detail is shifted to the right. If there is a touching motion over touchpad 5 downward and simultaneously a touching motion over touchpad 4 downward, then the map detail is shifted downward. If there is a touching motion over touchpad 5 upward and simultaneously a touching motion over touchpad 4 upward, then the map detail is shifted upward.

Figure 7:
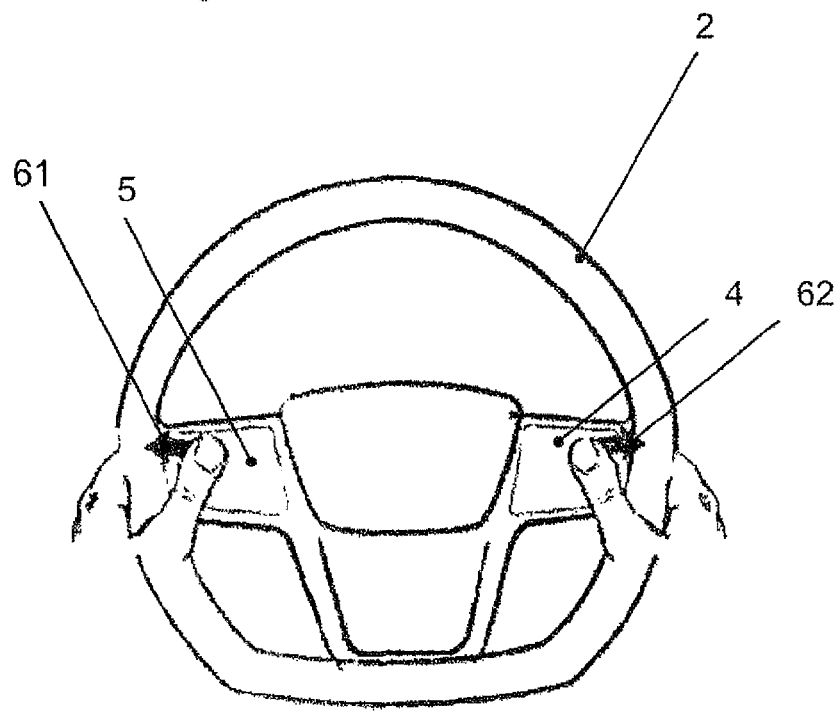
FIG. 7 shows a steering wheel represented in FIG. 2.
Figures 11, 12:
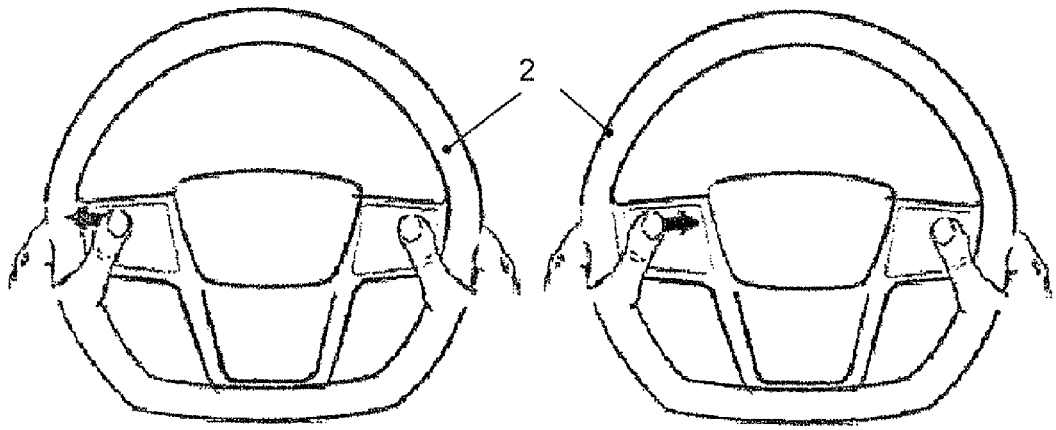
FIG. 11 shows the steering wheel represented in FIG. 2.
FIG. 12 shows the steering wheel represented in FIG. 2.
Figures 13, 14:
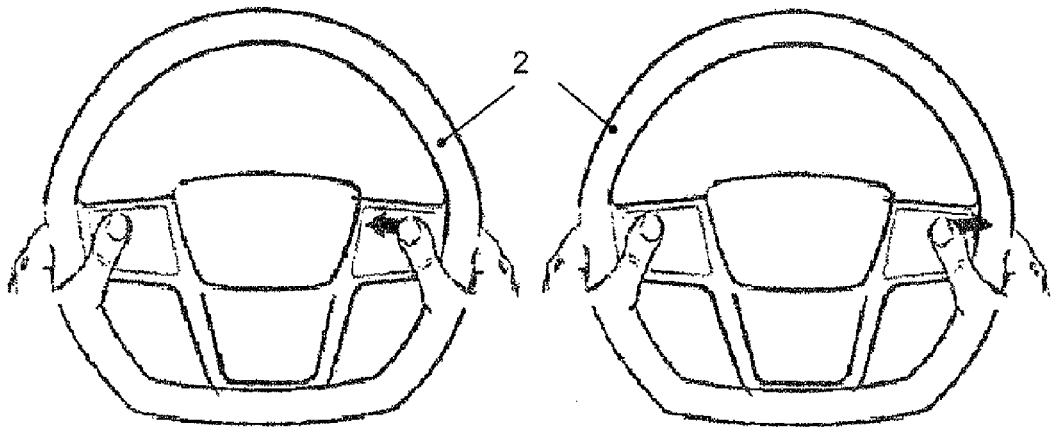
FIG. 13 shows the steering wheel represented in FIG. 2.
FIG. 14 shows the steering wheel represented in FIG. 2.

If a list is represented on the display for example, as shown in exemplary fashion in FIGS. 6 to 8 of German Published Patent Application No. 101 39 693, then it is possible to scroll through the represented lists by touching touchpads 4 and 5. If there is a touching motion over touchpad 5 toward the left for example—as shown in FIG. 11—without the occurrence of a touching motion over touchpad 4, then the action is one of scrolling toward the left or upward. If there is a touching motion over touchpad 5 toward the right for example—as shown in FIG. 12—without the occurrence of a touching motion over touchpad 4, then the action is one of scrolling toward the right or downward. If there is a touching motion over touchpad 4 toward the left for example—as shown in FIG. 13—without the occurrence of a touching motion over touchpad 5, then the action is one of scrolling toward the left or upward. If there is a touching motion over touchpad 4 toward the right for example—as shown in FIG. 14—without the occurrence of a touching motion over touchpad 5, then the action is one of scrolling toward the right or downward.

On the other hand, if there is a touching motion of touchpad 5 toward the left and simultaneously a touching motion of touchpad 4 toward the left, then the action is one of scrolling toward the left or upward at an increased speed. If there is a touching motion of touchpad 5 toward the right and simultaneously a touching motion of touchpad 4 to the right, then the action is one of scrolling toward the right or downward at an increased scrolling speed.

FIGS. 15 to 20 show operating clusters for alternative use in place of touchpads 4 and 5. In this instance there may be a provision for the operating cluster shown in FIG. 15, 17, or 19 to replace touchpad 5 and/or for the operating cluster shown in FIG. 16, 18, or 20 to replace touchpad 4.

Figure 15:
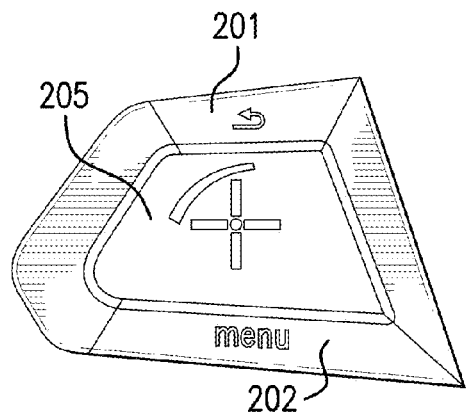
FIG. 15 shows an exemplary embodiment of an operating cluster.
Figure 16:
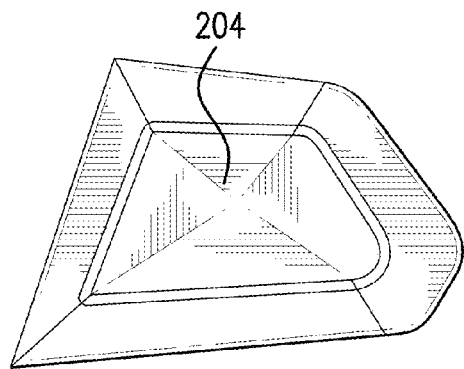
FIG. 16 shows another exemplary embodiment of an operating cluster.

The operating cluster represented in FIG. 15 includes a concave touchpad 205, a return button 201 and a button 202 for calling up a main menu. The operating cluster represented in FIG. 16 includes a concave touchpad 204.

Figure 17:
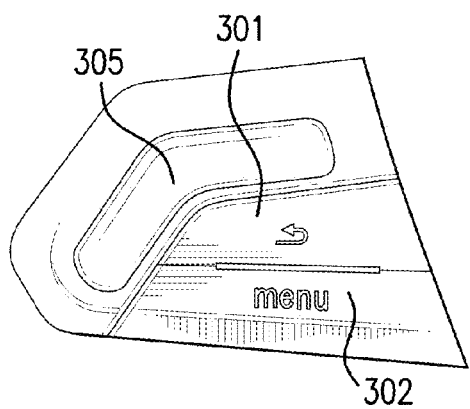
FIG. 17 shows another exemplary embodiment of an operating cluster.
Figure 18:
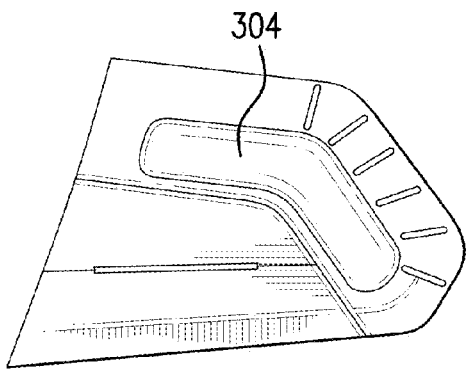
FIG. 18 shows another exemplary embodiment of an operating cluster.

The operating cluster represented in FIG. 17 includes a boomerang-shaped touchpad 305, below which a return button 301 and a button 302 for calling up a main menu are situated. The operating cluster represented in FIG. 18 includes a boomerang-shaped touchpad 304 arranged in mirror image.

Figure 19:
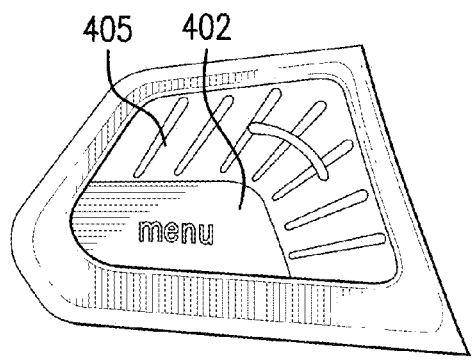
FIG. 19 shows another exemplary embodiment of an operating cluster.
Figure 20:
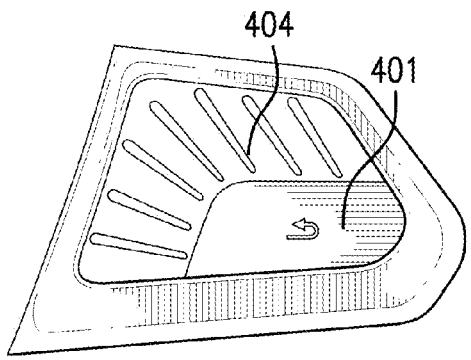
FIG. 20 shows another exemplary embodiment of an operating cluster.

The operating cluster represented in FIG. 19 includes a grooved touchpad 405, below which a button 402 for calling up a main menu is situated. The operating cluster represented in FIG. 20 includes a grooved touchpad 404 developed in mirror image, below which a return button 401 is situated.

LIST OF REFERENCE CHARACTERS

1 Motor vehicle
2, 102 Steering wheel
3 Display
4, 5, 104, 105,
204, 205, 304,
305, 404, 405, Touchpad
10 Control system
11 Mobile telephone
12 Bluetooth interface
13 Navigation system
14 Automatic climate control
15 Infotainment system
16 Vehicle control unit
19 Bus system
31, 32 Interface
33, 34 Evaluation module
35 Coordination module
41, 44, 45, 46,
48, 49, 51, 53,
54 Step
42, 43, 47, 52 Query
61, 62, 63, 64 Arrow
201, 301, 401 Return button
202, 302, 402 Button for calling up a main menu
B Command
TP4, TP5 Output signal

What is claimed is:

1. A motor vehicle, comprising:
   a steering wheel;
   a first touchpad integrated into the steering wheel adapted to input commands;
   a second touchpad adapted to input commands integrated into the steering wheel and spatially separated from the first touchpad;
   a coordination module adapted to generate a command to operate a function of the motor vehicle as a function of a touch motion over the first touchpad and a simultaneously-occurring touch motion over the second touchpad; and
   a display adapted to represent a map detail, the map detail be scalable as a function of a touch motion over the first touchpad and a simultaneously-occurring touch motion over the second touchpad;
   wherein the map detail is enlargeable as a function of a touch motion over the first touchpad and a simultaneously-occurring touch motion over the second touchpad, the touch motion over the first touchpad and the touch motion over the second touchpad being directed toward the edge of the steering wheel and in substantially opposite directions from each other.

2. The motor vehicle according to claim 1, wherein the first touchpad is situated in a left lateral region of the steering wheel.

3. The motor vehicle according to claim 1, wherein the second touchpad is situated in a right lateral region of the steering wheel.

4. The motor vehicle according to claim 1, wherein the map detail is reducible as a function of a touch motion over the first touchpad directed toward a center of the steering wheel and a simultaneously-occurring touch motion over the second touchpad directed toward the center of the steering wheel.

5. The motor vehicle according to claim 1, wherein the first touchpad is situated in a left lateral region of the steering wheel, the second touchpad is situated in a right lateral region of the steering wheel, and the map detail is enlargeable as a function of a touch motion over the first touchpad directed toward the left and a simultaneously-occurring touch motion over the second touchpad directed toward the right.

6. The motor vehicle according to claim 5, wherein the map detail is reducible as a function of a touch motion over the first touchpad directed toward the right and a simultaneously-occurring touch motion over the second touchpad directed toward the left.

7. The motor vehicle according to claim 6, wherein the map detail is shiftable in a direction of a touch motion over the first touchpad directed toward an edge of the steering wheel as a function of the touch motion over the first touchpad directed toward the edge of the steering wheel and a simultaneously-occurring touch motion over the second touchpad directed toward a center of the steering wheel.

8. The motor vehicle according to claim 7, wherein the map detail is shiftable in a direction of a touch motion over the first touchpad directed toward the center of the steering wheel as a function of the touch motion over the first touchpad directed toward the center of the steering wheel and a simultaneously-occurring touch motion over the second touchpad directed toward the edge of the steering wheel.

9. The motor vehicle according to claim 1, further comprising a display adapted to represent a list of selectable list entries, the list scrollable at a first scrolling speed as a function of a touch motion over the first touchpad through the list, the list scrollable at a second scrolling speed as a function of a touch motion over the first touchpad and a simultaneously-occurring touch motion over the second touchpad, the second scrolling speed being greater than the first scrolling speed.

10. A motor vehicle, comprising:
a steering wheel;
a first touchpad integrated into the steering wheel adapted to input commands;
a second touchpad adapted to input commands integrated into the steering wheel and spatially separated from the first touchpad;
a coordination module adapted to generate a command to operate a function of the motor vehicle as a function of a touch motion over the first touchpad and a simultaneously-occurring touch motion over the second touchpad; and
a display adapted to represent a map detail, the map detail be shiftable as a function of a touch motion over the first touchpad and a simultaneously-occurring touch motion over the second touchpad;
wherein the map detail is shiftable in a direction of a touch motion over the first touchpad directed toward an edge of the steering wheel as a function of the touch motion over the first touchpad directed toward the edge of the steering wheel and a simultaneously-occurring touch motion over the second touchpad directed toward a center of the steering wheel.

11. The motor vehicle according to claim 10, wherein the map detail is shiftable in a direction of a touch motion over the first touchpad directed toward the center of the steering wheel as a function of the touch motion over the first touchpad directed toward the center of the steering wheel and a simultaneously-occurring touch motion over the second touchpad directed toward the edge of the steering wheel.

12. The motor vehicle according to claim 10, wherein the first touchpad is situated in a left lateral region of the steering wheel, the second touchpad is situated in a right lateral region of the steering wheel, and the map detail is shiftable toward the left as a function of a touch motion over the first touchpad directed toward the left and a simultaneously-occurring touch motion over the second touchpad directed toward the left.

13. The motor vehicle according to claim 12, wherein the map detail is shiftable toward the right as a function of a touch motion over the first touchpad directed toward the right and a simultaneously-occurring touch motion over the second touchpad directed toward the right.

14. The motor vehicle according to claim 10, wherein the map detail is shiftable downward as a function of a downwardly-directed touch motion over the first touchpad and a simultaneously-occurring downwardly-directed touch motion over the second touchpad.

15. The motor vehicle according to claim 14, wherein the map detail is shiftable upward as a function of an upwardly-directed touch motion over the first touchpad and a simultaneously-occurring upwardly-directed touch motion over the second touchpad.

16. A method for operating a motor vehicle having a steering wheel, a first touchpad integrated into the steering wheel adapted to input commands, and a second touchpad integrated into the steering wheel and spatially separated from the first touchpad adapted to input commands, comprising:
detecting a touch motion over the first touchpad;
detecting a simultaneously-occurring touch motion over the second touchpad;
generating a command to operate a function of the motor vehicle as a function of the touch motion over the first touchpad and the simultaneously-occurring touch motion over the second touchpad; and
displaying a map detail, the map detail scalable as a function of a touch motion over the first touchpad and a simultaneously-occurring touch motion over the second touchpad;
wherein the map detail is enlargeable as a function of a touch motion over the first touchpad and a simultaneously-occurring touch motion over the second touchpad, the touch motion over the first touchpad and the touch motion over the second touchpad being directed toward the edge of the steering wheel and in substantially opposite directions from each other.

17. A method for operating a motor vehicle having a display, a steering wheel, a first touchpad integrated into the steering wheel adapted to input commands, and a second touchpad integrated into the steering wheel and spatially separated from the first touchpad adapted to input commands, comprising:
detecting a touch motion over the first touchpad;
detecting a simultaneously-occurring touch motion over the second touchpad; and
scaling a map detail represented by the display as a function of the touch motion over the first touchpad and the simultaneously-occurring touch motion over the second touchpad;
wherein the scaling includes enlarging the map detail as a function of a touch motion over the first touchpad and a simultaneously-occurring touch motion over the second touchpad, the touch motion over the first touchpad and the touch motion over the second touchpad being directed toward the edge of the steering wheel and in substantially opposite directions from each other.

18. The method according to claim 17, wherein the scaling includes reducing the map detail as a function of a touch motion over the first touchpad directed toward a center of the steering wheel and a simultaneously-occurring touch motion over the second touchpad directed toward the center of the steering wheel.

19. The method according to claim 17, wherein the first touchpad is situated in a left lateral region of the steering wheel, the second touchpad is situated in a right lateral region of the steering wheel, and scaling including enlarging the map detail as a function of a touch motion over the first touchpad directed toward the left and a simultaneously-occurring touch motion over the second touchpad directed toward the right.

20. The method according to claim 19, wherein the scaling includes reducing the map detail as a function of a touch motion over the first touchpad directed toward the right and a simultaneously-occurring touch motion over the second touchpad directed toward the left.

21. A method for operating a motor vehicle having a display, a steering wheel, a first touchpad integrated into the steering wheel adapted to input commands, and a second touchpad integrated into the steering wheel and spatially separated from the first touchpad adapted to input commands, comprising:
- detecting a touch motion over the first touchpad;
- detecting a simultaneously-occurring touch motion over the second touchpad; and
- shifting a map detail represented by the display as a function of the touch motion over the first touchpad and the simultaneously-occurring touch motion over the second touchpad;
- wherein the shifting includes at least one of:
- (a) shifting the map detail left as a function of a touch motion over the first touchpad directed to the left and a simultaneously-occurring touch motion over the second touchpad directed toward the left;
- (b) shifting the map detail right as a function of a touch motion over the first touchpad directed toward the right and a simultaneously-occurring touch motion over the second touchpad directed toward the right;
- (c) shifting the map detail downward as a function of a downwardly-directed touch motion over the first touchpad and a simultaneously-occurring downwardly-directed touch motion over the second touchpad; and
- (d) shifting the map detail upward as a function of an upwardly-directed touch motion over the first touchpad and a simultaneously-occurring upwardly directed touch motion over the second touchpad.

* * * * *